Feb. 6, 1951 C. M. MAYER 2,540,627
VENTING MEANS FOR COOKING RANGES

Filed April 13, 1948 2 Sheets-Sheet 1

INVENTOR.
Charles M. Mayer
BY
Chas. H. Trotter
Atty.

Patented Feb. 6, 1951

2,540,627

UNITED STATES PATENT OFFICE 2,540,627

VENTING MEANS FOR COOKING RANGES

Charles M. Mayer, Mansfield, Ohio, assignor to The Tappan Stove Company, Mansfield, Ohio, a corporation of Ohio Application April 13, 1948, Serial No. 20,677

2 Claims. (Cl. 126—21)

This invention relates to venting means for the oven and broiler compartments of a cooking range having a plurality of top burners, with utensil-supporting grates thereover. It is particularly adapted for use on cooking ranges of the table top type wherein a working space is provided on the top of the stove adjacent the burner grates. This application is a continuation in part of my co-pending application Serial No. 540,769, filed June 17, 1944, now abandoned.

The principal object of the invention is to provide a concealed venting means, for the oven and broiler compartments of a cooking range, which discharges through one of the burner grates thereby eliminating a separate grate over the discharge end of the venting means.

Another object of the invention is to provide a concealed venting means, for cooking ranges of the table top type, which discharges the products of combustion from the oven and broiler compartments upwardly from the top of the range, and which is so constructed and arranged that it will not interfere with the use of the working space adjacent the burner grates.

Another object of the invention is to provide a venting means of this character which discharges the products of combustion from the oven and broiler compartments through one of the burner grates, and which is so constructed and arranged that the discharge products of combustion cannot mingle with the secondary air supplied to the top burners and thereby impair their efficiency.

Another object of the invention is to provide a venting means for the oven and broiler compartments of cooking ranges which is efficient in operation and which can be manufactured much more economically than previously known apparatus of this character.

Other and more limited objects of the invention will be apparent from the following specification and the accompanying drawings forming a part thereof wherein.

Figure 1:
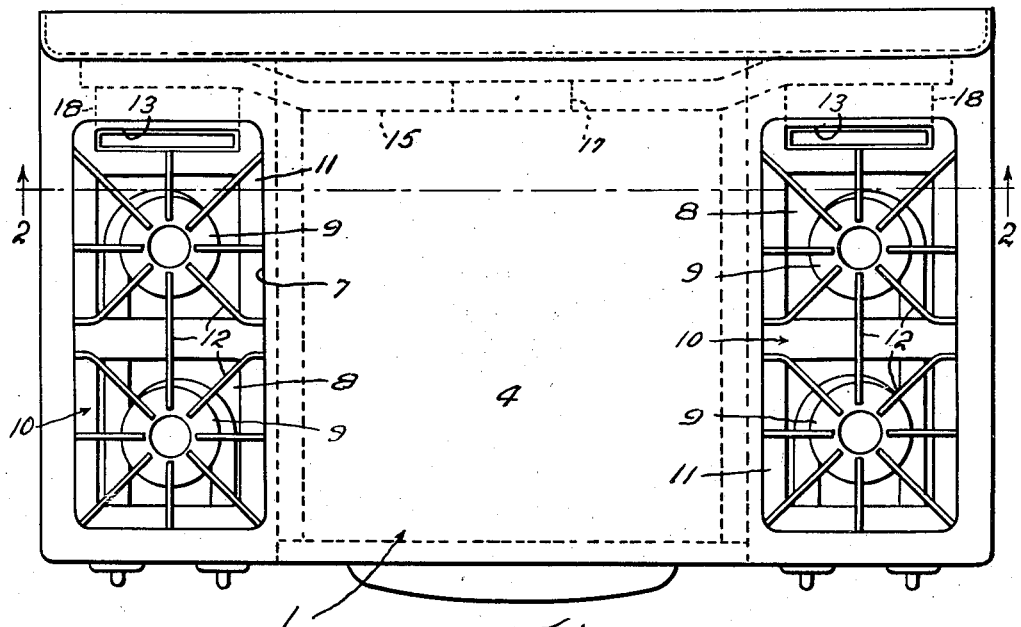
Fig. 1 is a top plan view of a gas cooking range of the divided top type showing my improved venting means incorporated therein.
Figure 4:
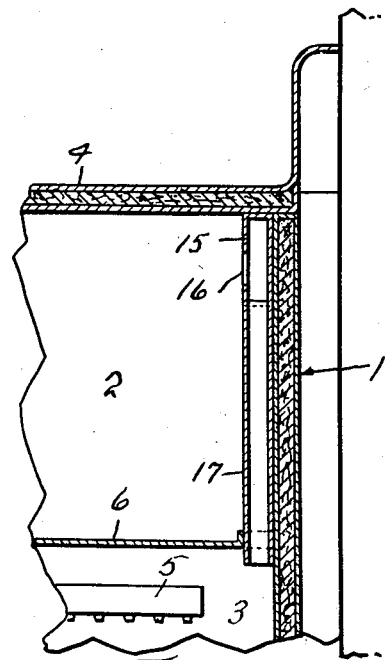
Fig. 4 is a transverse vertical section taken on the line 4—4 of Fig. 2.
Figure 3:
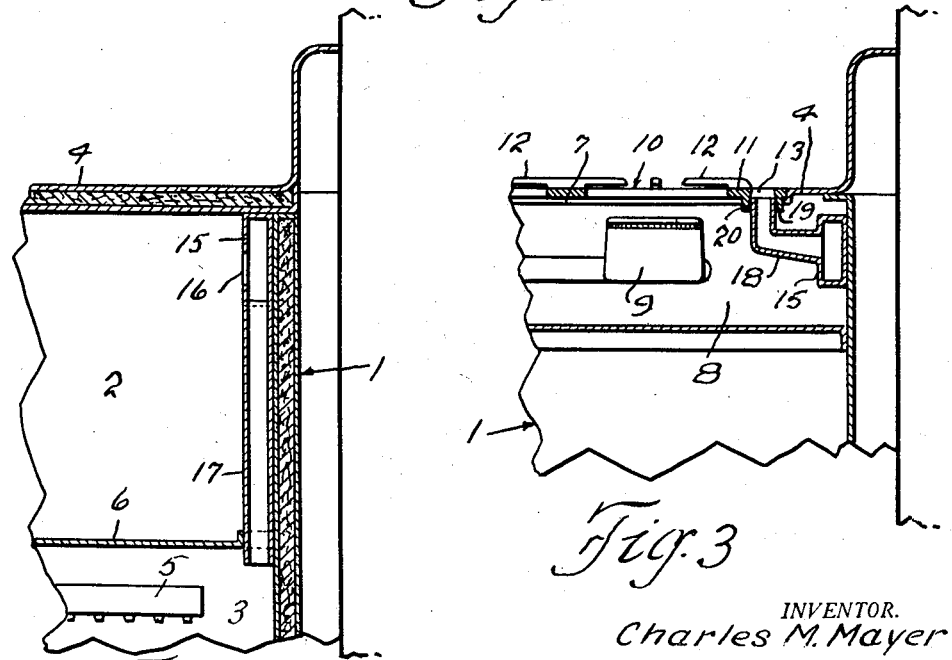
Fig. 3 is a transverse vertical section taken on the line 3—3 of Fig. 2.
Figure 2:
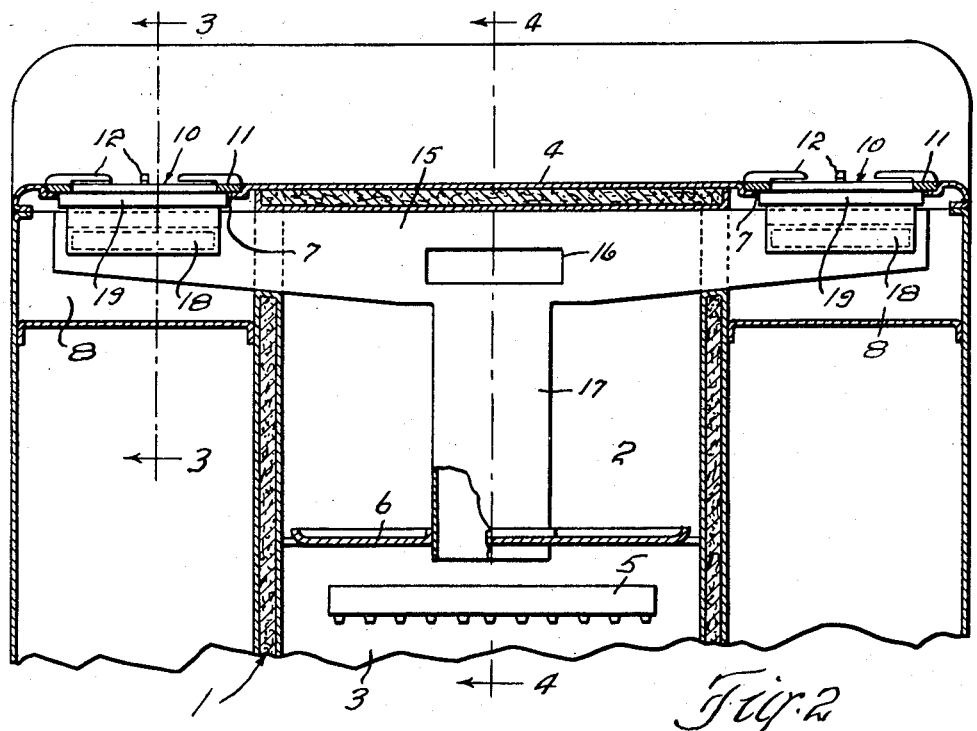
Fig. 2 is a longitudinal vertical section taken on the line 2—2 of Fig. 1.
Figure 5:
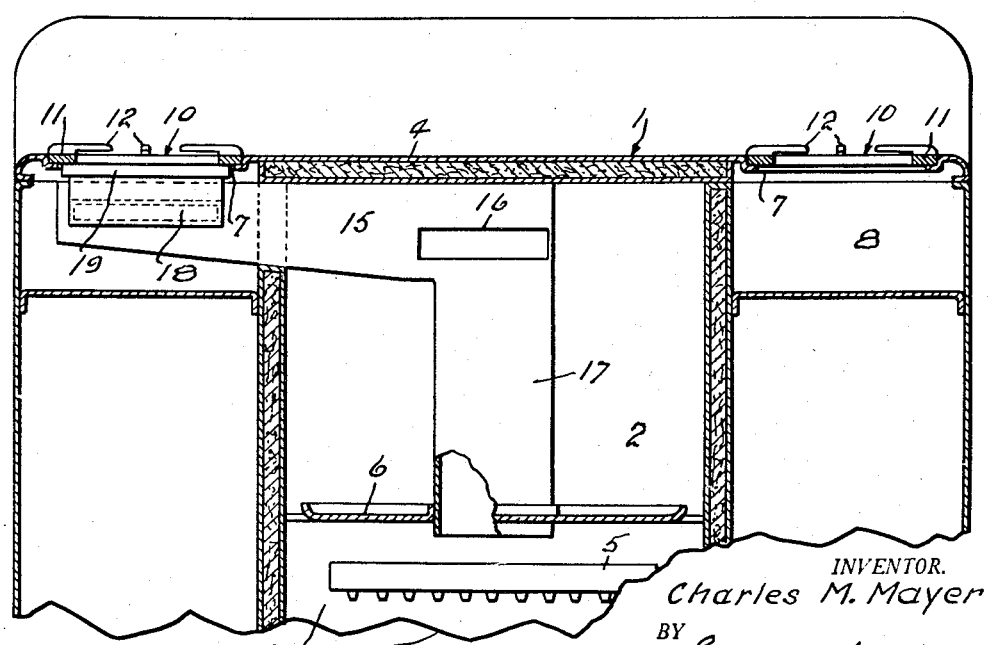
Fig. 5 is a view similar to Fig. 2 showing a slightly modified form of my invention.

In the drawings I have illustrated my invention as applied to a cooking range of the type generally known as the divided top in which a pair of burners are disposed along each side of the range leaving a substantial working surface therebetween.

Referring now to the drawings by reference characters, the numeral 1 indicates generally a cooking range having an oven 2 and a broiler compartment 3. The oven 2 is disposed centrally of the range just beneath the top 4 thereof so that the bottom surface of the top 4 constitutes the top wall of the oven. The range may be of the insulated type if desired, or it may be of the uninsulated type. As shown, it is of the insulated type wherein the range top and the side walls of the oven and broiler compartments are made up of two spaced metallic sheets, with the space between them filled with suitable insulating material as is standard practice. The broiler 3 is disposed directly below the oven 2 and is of substantially the same width and depth as the oven 2. Both the oven 2 and broiler compartment 3 are heated by a suitable gas burner 5 in the broiler compartment 3 directly below the oven bottom 6.

At each side of the range directly below openings 7 in the top 4 thereof there is a burner compartment 8 which extends from the front to the back of the range and from a side wall of the oven to a side wall of the range. A pair of top burners 9 are suitably mounted in each of the compartments 8, beneath the openings 7 in the top 4. A grate 10 is removably supported by the top 4 in each of the openings 7.

Each grate 10 consists of a peripheral frame 11 and a plurality of utensil supporting fingers 12 which are cast integral with the frame 11. When in operative position the top of the frame 11 is disposed substantially flush with the top of the stove. The fingers 12 extend radially inwardly from the frame 11 over the burners 9, with the upper or utensil supporting surface of each finger disposed in a plane which is parallel to and spaced above the frame 11. The rear side of each frame 11 has a vertically disposed vent-opening 13 therethrough, the purpose of which will be hereinafter described.

In cooking ranges having oven and broiler compartments which are heated by gas burners it is necessary to vent the oven and broiler compartments to the atmosphere so that the products of combustion and other vapors generated therein may be discharged therefrom. To accomplish this I provide an horizontally disposed duct 15 adjacent the upper rear corner of face of said fingers being disposed above said frame, and a vertically extending vent-opening through one side of said frame; an oven adjacent one side of said burner compartment, a broiler compartment disposed below said oven, a venting conduit extending upwardly from said broiler compartment into said oven along the rear wall thereof and thence outwardly into said burner compartment and then upwardly into register with said vent opening, and an opening through the wall of said conduit within said oven.

2. In a gas range the combination of a top, a pair of spaced openings through said top, a burner compartment beneath each of said openings, a gas burner in each of said compartments, a grate removably mounted in each of said openings above a burner; each of said grates comprising a peripheral frame, a plurality of utensil-supporting fingers extending from said frame and over a burner, the supporting surface of said fingers being disposed above said frame, and a vertically extending vent opening through one side of said frame; an oven disposed between said burner compartments, a broiler disposed below said oven, a venting conduit extending horizontally across the oven adjacent the rear wall thereof with the ends of said conduit projecting outwardly from said oven into said burner compartments and then upwardly into register with said vent openings, an opening through the wall of said conduit within said oven, and a branch conduit extending upwardly from said broiler compartment and having the upper end thereof connected to said horizontally extending conduit.

CHARLES M. MAYER.

REFERENCES CITED

The following references are of record in the file of this patent:

UNITED STATES PATENTS

| Number | Name | Date |
|---|---|---|
| 223,977 | Armour | Feb. 3, 1880 |
| 539,382 | Edel | May 14, 1895 |
| 1,872,019 | Taylor | Aug. 16, 1932 |
| 2,105,596 | Hoff | Jan. 18, 1938 |
| 2,290,360 | Rose | July 21, 1942 |
| 2,337,349 | Rees | Dec. 21, 1943 |
| 2,339,197 | Rutenber | Jan. 11, 1944 |
| 2,375,047 | Sutherland | May 1, 1945 |
| 2,376,571 | Brumbaugh | May 22, 1945 |
| 2,384,262 | Rutan | Sept. 4, 1945 |
| 2,452,715 | Bauer | Nov. 2, 1948 |

FOREIGN PATENTS

| Number | Country | Date |
|---|---|---|
| 680,986 | Germany | Sept. 11, 1939 |